United States Patent
DeFillipi et al.

(10) Patent No.: US 10,696,033 B2
(45) Date of Patent: Jun. 30, 2020

(54) APPARATUS FOR APPLYING PROTECTIVE FILMS

(71) Applicant: EXEL INDUSTRIES, Paris (FR)

(72) Inventors: Michael DeFillipi, Plymouth, MI (US); Vipin Patel, Livonia, MI (US)

(73) Assignee: EXEL INDUSTRIES, Paris (FR)

( * ) Notice: Subject to any disclaimer, the term of this patent is extended or adjusted under 35 U.S.C. 154(b) by 25 days.

(21) Appl. No.: 15/910,367

(22) Filed: Mar. 2, 2018

(65) Prior Publication Data

US 2018/0186143 A1    Jul. 5, 2018

Related U.S. Application Data

(62) Division of application No. 15/349,349, filed on Nov. 11, 2016, which is a division of application No.
(Continued)

(51) Int. Cl.
*B05D 1/26* (2006.01)
*B05D 1/40* (2006.01)
(Continued)

(52) U.S. Cl.
CPC .......... *B32B 37/153* (2013.01); *B05C 5/0216* (2013.01); *B05C 5/0254* (2013.01); *B05C 5/0283* (2013.01); *B05D 1/26* (2013.01); *B05D 1/42* (2013.01); *B05D 5/00* (2013.01); *B29C 48/07* (2019.02); *B29C 48/154* (2019.02);
(Continued)

(58) Field of Classification Search
CPC ..... B29C 48/07; B29C 48/305; B05C 5/0254; B05C 5/0283
See application file for complete search history.

(56) References Cited

U.S. PATENT DOCUMENTS

| 4,753,819 A | 6/1988 | Shimada |
| 5,010,131 A | 4/1991 | Wagner |

(Continued)

FOREIGN PATENT DOCUMENTS

| CA | 2289923 A1 | 11/1998 |
| EP | 1008632 A2 | 6/2000 |

(Continued)

OTHER PUBLICATIONS

MacMinn, C.W., and G. H. McKinley, "Tubeless Siphon and Die Swell Demonstration", Sep. 26, 2004, available on-line at http://web.mit.edu/nnf/research/phenomena/Demos.pdf (Year: 2004).*

*Primary Examiner* — Mark A Osele
(74) *Attorney, Agent, or Firm* — Young Basile Hanlon & MacFarlane, P.C.

(57) ABSTRACT

An applicator die for creating undivided ribbons of polymeric film and a method of using the die to apply an emulsified polymeric material in ribbons to a fully or partially finished surface of an automobile body. In one application, the ribbon is applied as a peelable film to an automobile body and in another application, a ribbon is applied to a rocker panel as an anti-chip coating. For both applications, the applicator die has an internal gallery and an outlet slot with flared edge surfaces to emit a laminarized ribbon of polymer-based material at a distance from the target surface where the opposite edges of the ribbon have become essentially parallel.

6 Claims, 12 Drawing Sheets

Related U.S. Application Data

14/311,533, filed on Jun. 23, 2014, now Pat. No. 10,000,049.

(51) Int. Cl.
  *B05C 5/02* (2006.01)
  *B32B 37/15* (2006.01)
  *B32B 37/00* (2006.01)
  *B05D 1/42* (2006.01)
  *B29C 48/154* (2019.01)
  *B05D 5/00* (2006.01)
  *B29C 48/07* (2019.01)
  *B29C 48/305* (2019.01)
  *B05D 1/32* (2006.01)

(52) U.S. Cl.
  CPC ........ *B29C 48/305* (2019.02); *B32B 37/0046* (2013.01); *B05D 1/325* (2013.01)

(56) References Cited

U.S. PATENT DOCUMENTS

| | | | |
|---|---|---|---|
| 5,143,949 A | 9/1992 | Grogan et al. | |
| 5,169,900 A | 12/1992 | Gudelis | |
| 5,186,978 A | 2/1993 | Woodhall et al. | |
| 5,212,215 A | 5/1993 | Nanri et al. | |
| 5,224,967 A | 7/1993 | Rolf et al. | |
| 5,244,957 A | 9/1993 | Best et al. | |
| 5,275,340 A | 1/1994 | Haruch | |
| 5,281,436 A | 1/1994 | Swidler | |
| 5,300,558 A | 4/1994 | Kurisu et al. | |
| 5,330,795 A | 7/1994 | Batdorf et al. | |
| 5,336,349 A | 8/1994 | Cornils et al. | |
| 5,358,397 A * | 10/1994 | Ligon | B30B 11/24 425/145 |
| 5,382,395 A * | 1/1995 | Hoenke | B29C 48/92 264/40.7 |
| 5,418,006 A | 5/1995 | Roth et al. | |
| 5,421,940 A * | 6/1995 | Cornils | B05C 5/001 156/244.11 |
| 5,509,969 A | 4/1996 | Grawe | |
| 5,548,017 A | 8/1996 | DiStefano | |
| 5,554,325 A | 9/1996 | Kotte et al. | |
| 5,736,470 A | 4/1998 | Schneberger et al. | |
| 5,824,734 A | 10/1998 | Yang | |
| 6,124,044 A | 9/2000 | Swidler | |
| 6,187,377 B1 * | 2/2001 | Tojo | B05B 12/04 427/156 |
| 6,773,804 B2 | 8/2004 | Enlow et al. | |
| 6,861,100 B1 * | 3/2005 | Schucker | B05C 5/02 427/385.5 |
| 7,043,815 B2 * | 5/2006 | Lande | B05D 1/265 29/430 |
| 7,169,841 B2 | 1/2007 | Schwalm et al. | |
| 8,263,231 B2 * | 9/2012 | Mesa | C09D 5/20 156/701 |
| 2002/0127334 A1 | 9/2002 | Gurer et al. | |
| 2003/0155451 A1 | 8/2003 | Nakamura et al. | |
| 2004/0180136 A1 * | 9/2004 | Nagase | B05C 1/02 427/154 |
| 2004/0261701 A1 | 12/2004 | Kobayashi et al. | |
| 2005/0155549 A1 * | 7/2005 | Pekurovsky | B05C 5/0254 118/410 |
| 2009/0104355 A1 | 4/2009 | Nakazawa et al. | |
| 2010/0167038 A1 * | 7/2010 | Linnenbrink | B29B 13/022 428/220 |
| 2012/0027942 A1 | 2/2012 | Joos | |
| 2015/0273496 A1 | 10/2015 | Shinoda et al. | |
| 2015/0367620 A1 | 12/2015 | DeFillipi | |

FOREIGN PATENT DOCUMENTS

| | | |
|---|---|---|
| GB | 2145640 A | 4/1985 |
| JP | 08276152 A * | 10/1996 |
| WO | 0067915 A1 | 11/2000 |

* cited by examiner

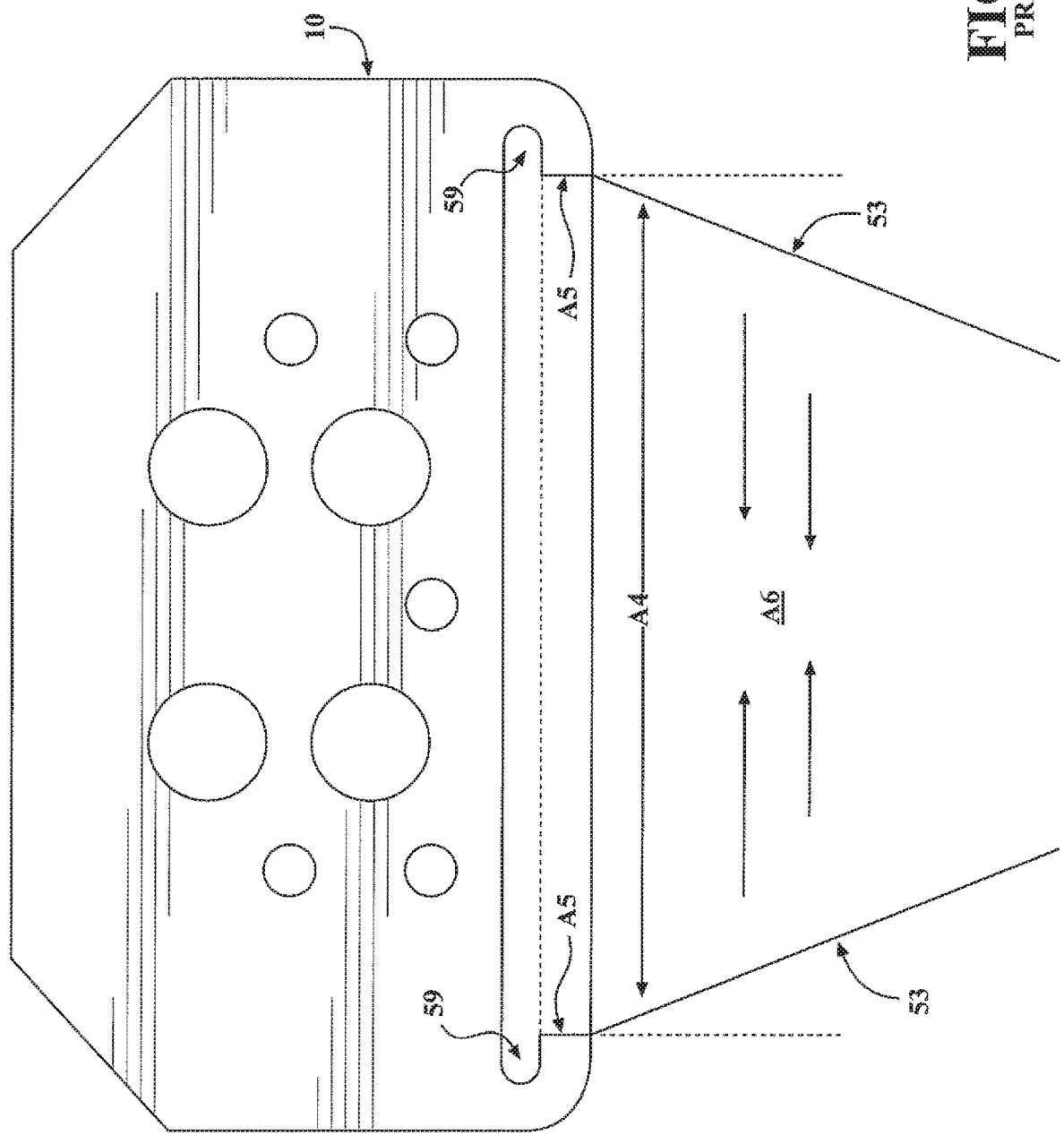

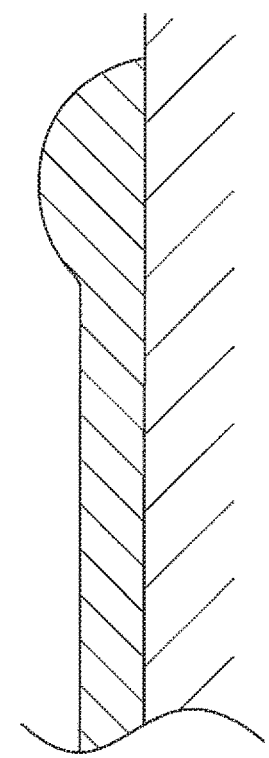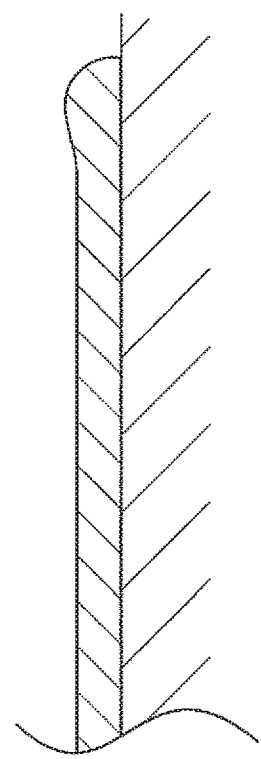
FIG. 7C
FIG. 7D ns and edge characteristics. This apparatus can create, for example, ribbons of polymeric film that have a desired thickness profile from edge to edge that promotes peelability and that can be applied extremely close to a part edge or a seam between adjacent assembled parts without crossing or bridging the seam. This virtually eliminates the problems associated with prior art spray methods as well as the labor-intensive steps of applying protectant from a paper backed roll of pre-extruded film. The device can also be used to apply ribbons of polymeric film for other purposes.

APPARATUS FOR APPLYING PROTECTIVE FILMS

CROSS REFERENCE TO RELATED APPLICATIONS

This application is a divisional of U.S. patent application Ser. No. 14/311,533, filed Jun. 23, 2014, now U.S. Pat. No. 10,000,049, and a divisional of U.S. patent application Ser. No. 15/349,349, filed Nov. 11, 2016 now U.S. Pat. No. 10,315,405; the entire contents of both are incorporated herein.

FIELD OF THE INVENTION

Disclosed herein is an apparatus for producing and applying ribbons of polymeric film to the surfaces of an article of manufacture, such as but not limited to an automobile body or a portion thereof, wherein the apparatus includes an extrusion die configured to hydraulically deliver a laminarized ribbon of polymer-based film with controlled width, thickness and edge characteristics.

BACKGROUND OF THE INVENTION

It is known to protect the painted exterior surfaces of glass and automobile parts with pre-formed, laminated sheets or sprayed-on polymeric films for various purposes; e.g., to reduce the likelihood of damage during shipment, storage and use or to act as spacers for stacking. There have been numerous problems associated with the application of such films. Spraying invokes the need to deal with environmental issues as well as overspray, both in the air and on parts of the article which are not to be coated. For non-permanent applications, it is often necessary to use solvents to remove the film. Lamination involves, first, the extrusion of a thin sheet of plastic film and, second, the step of joining the plastic film to a paper backing so it can be rolled up for shipment or storage. When the time comes to apply the film to, for example, an automobile body, several laborers are required to unroll the paper-backed film, lay the film over the automobile, remove the paper backing, and smooth the film. The result is a peelable film requiring no solvents or detergents for removal, but the manufacturing and application processes are labor intensive and, therefore, creates substantial expense.

It is also known to apply a film or coating of resilient protective polymeric material such as PVC to the rocker panels and other locations on automobile bodies to serve as an anti-chip coating. The coating is typically sprayed onto the vehicle rocker panel during the painting phase and dried or cured using, for example, standard paint oven convection heating. This sprayed-on method of application requires carefully masking of the body of the vehicle for overspray protection, which is labor-intensive. The masking must also be removed and disposed of, adding further cost to the process.

SUMMARY OF THE INVENTION

In general, this document discloses a device and a system in which large and small areas of fully or partially finished surfaces of manufactured products can be temporarily or permanently coated with polymer-based protective films, which films can be applied by the controlled hydraulic "extrusion" of a laminarized ribbon of polymer-based material without atomization and with controlled width, thickness and edge characteristics. This apparatus can create, for example, ribbons of polymeric film that have a desired thickness profile from edge to edge that promotes peelability and that can be applied extremely close to a part edge or a seam between adjacent assembled parts without crossing or bridging the seam. This virtually eliminates the problems associated with prior art spray methods as well as the labor-intensive steps of applying protectant from a paper backed roll of pre-extruded film. The device can also be used to apply ribbons of polymeric film for other purposes.

An aspect of the subject matter described herein is an applicator die for producing a ribbon or film of fluidized polymeric material directly onto a surface to be protected without atomization or other division of the film leaving the die. The applicator die can be robotically guided and controlled as to spacing from the target surface to dynamically and consistently lay down a polymeric film of the desired width, length, thickness and edge characteristics in a precise fashion, i.e., coming very close to seams and part edges, and at low labor cost. Although the examples described herein involve fairly flat surfaces, the applicator can be configured to conform to curved or complex surfaces. The applicator described herein may be said to "hydraulically extrude" a film of laminarized, emulsified polymeric material in a ribbon with such well controlled edge-to-edge consistency and thickness as to be suitable for masking as well as protection. A preferred emulsion thickness for protecting painted auto body surfaces is 200 microns (wet) with slight beads on the edges to promote peelability. This is readily distinguished from sound-deadening material which is generally 2000 or more microns thick and is not peelable. When used to produce a protective layer for an automobile body, the prior art steps of pre-extruding and backing a film are eliminated because the robotic arm guiding the applicator can be indexed to produce multiple overlapping ribbons that together cover large uninterrupted areas right up to edges or seams. Moreover, the applicator hereinafter described in detail can be "ambidextrous" in that it is capable of producing adjacent parallel ribbons of plastic film without indexed rotation for reversal; i.e., the applicator can be reversed in its direction of travel. In addition, the applicator can be used to apply different materials for different purposes to horizontal, vertical and inverted surfaces, whether flat, concave or convex.

Another aspect of the subject matter described herein is the use of the applicator die described above to apply a protective film of a polymeric material, such as an aqueous solution of polyvinyl acetate (PVA), to the fully or partially finished surfaces of an automobile body or component part therefor. As stated above, this may be for masking or protection purposes, in which case the film is temporary and must be peelable. The film is, after curing, readily and easily peelable without the use of solvents of detergents in large part because it is of its thickness profile across its width. For the reasons described above, this process is highly efficient due in part to the fact that the application of overlapping polymeric ribbons, applied in a back and forth fashion to cover large areas, can be carried out simply by indexing the applicator between parallel rows and without the need to rotate the applicator 180° for the next run. The applicator can essentially be moved relative to the application surface at about the velocity at which the applied material is emitted from the applicator die. Velocities of about 1500 to 2000 mm/second have been achieved. However, translation speed will vary from application to application.

As further described herein, the preferred applicator die comprises a two-part body with an inlet, an internal gallery, a bottom edge in which a long, narrow, outlet groove is created by a spacer or shim placed between the two mirror-image body parts, and the shim thickness controls the thickness of the film or ribbon to be extruded. The preferred gallery includes internal grooves in the two body parts that face each other and run parallel to and adjacent the bottom edge, although a one-sided groove arrangement is also feasible. The gallery groove or grooves create an internal volume for material received from the inlet and emit or "extrude" that material through the slot between the facing surfaces of the two body parts. The shim geometry relative to the gallery groove has been found to be important in controlling film edge qualities; i.e., the gallery grooves are radiussed, i.e., 180° rounded at their ends and the shim is designed with a top edge that lies along the top edge of a gallery groove and with side edges that flare out at an angle of about 5° to 50° but preferably 17° to create a slightly broadening film. Importantly, the length of the extrusion slot surfaces over which the film material passes between the gallery slot and the die exit edge is constant from one edge of the slot to the other and we have found that this ensures a substantially uniform film flow velocity across the entire width of the extrusion slot.

For peelable protective film or for masking, a film with a uniform thickness of 200 microns from edge to edge is preferred. This results from the shim geometry shown in FIG. 11B and described below. An exemplary film width is 75-85 mm.

Another aspect of the subject matter disclosed herein is the use of the aforementioned applicator die in applying an anti-chip coating to, for example, the rocker panels of an automobile body. In this case, the material being applied can be an undirected; i.e., non-atomized, laminar-flowing ribbon of emulsified polyvinyl chloride (PVC). In the preferred embodiment, the PVC ribbon is applied over electro-coat primer previously applied on the rocker panel but before the application of the paint primer, base color and clear coat. It has been determined that it is not necessary to wait for the PVC ribbon to completely dry before the paint primer is applied; i.e., the subsequent coatings can be applied "wet-on-wet," greatly reducing production time and totally eliminating the need for masking and spraying as are required in the prior art techniques.

Other advantages, features and characteristics of the subject matter disclosed herein, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF DESCRIPTION OF THE DRAWINGS

The description herein makes reference to the accompanying drawings wherein like reference numerals refer to like parts throughout the several views and wherein.

DETAILED DESCRIPTION OF THE
ILLUSTRATIVE EMBODIMENTS

Figure 1:
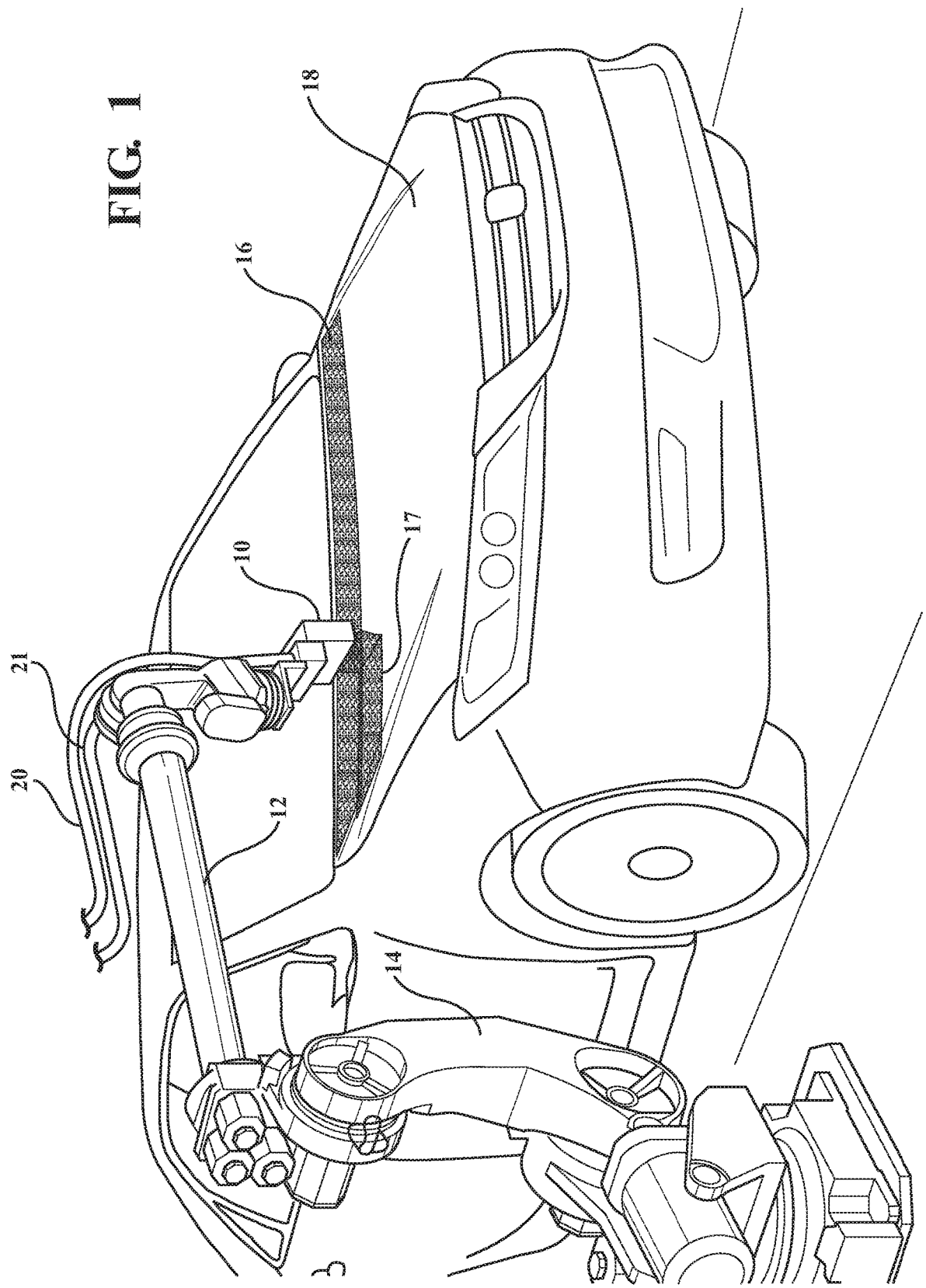
FIG. 1 is a perspective view of an applicator die as described herein mounted on a robot arm and used to apply a protective film to the hood of an automobile.

Referring to FIG. 1, an applicator die 10 is shown mounted on the end of an arm 12 of a numerically controlled multi-axis robot 14 capable of moving the applicator die in three-dimensional space as well as rotating the applicator die about multiple axes. The robot itself is conventional. The applicator die 10 is shown engaged in a process of applying 85 mm wide and 200 micron thick ribbons 16, 17 of polymeric film to the hood of an automotive vehicle which has been painted and essentially fully assembled, ready for shipment to a dealer. In FIG. 1, a first ribbon 16 has been applied across the rearmost portion of the hood 18; i.e., the portion closest to the windshield of the automobile, by moving the robot from right to left along a slightly curved path as shown in FIG. 1. The robot then indexed the arm 12 toward the front of the vehicle and is shown in the process of applying a second ribbon 17 moving from left to right across the hood 18 as seen in FIG. 1. Each ribbon is approximately 85 mm wide, and with an overlap with the adjacent ribbon or ribbons of about 1-7 mm. The preferred thickness profile for this particular application is uniform from edge to edge at about 200 microns.

The material being applied is an aqueous solution of polyvinyl acetate (PVA) at a temperature between about 70° and 120° F. and with a viscosity of about 3000 to 12,000 centipoise. Material is supplied to applicator die 10 under close temperature and flow rate control conditions via supply conduit 20; temperature-controlled liquid is supplied via conduit 21. The velocity of the material ribbon from the applicator can, for example, be as much as about 2000 mm/second and the robot 14 moves the applicator die 10 relative to the surface of the hood 18 at about that same speed. The spacing between the material outlet, i.e., the bottom edge of the applicator die 10 and the surface of the hood 18 is about 5 to 15 mm. The ratio of polymer to water in the applied material in an illustrative case is approximately 50/50 but will vary with the application. These figures are given by way of example. Robot speed, extrusion rate, spacing and emulsion ratios can all vary.

Figure 2:
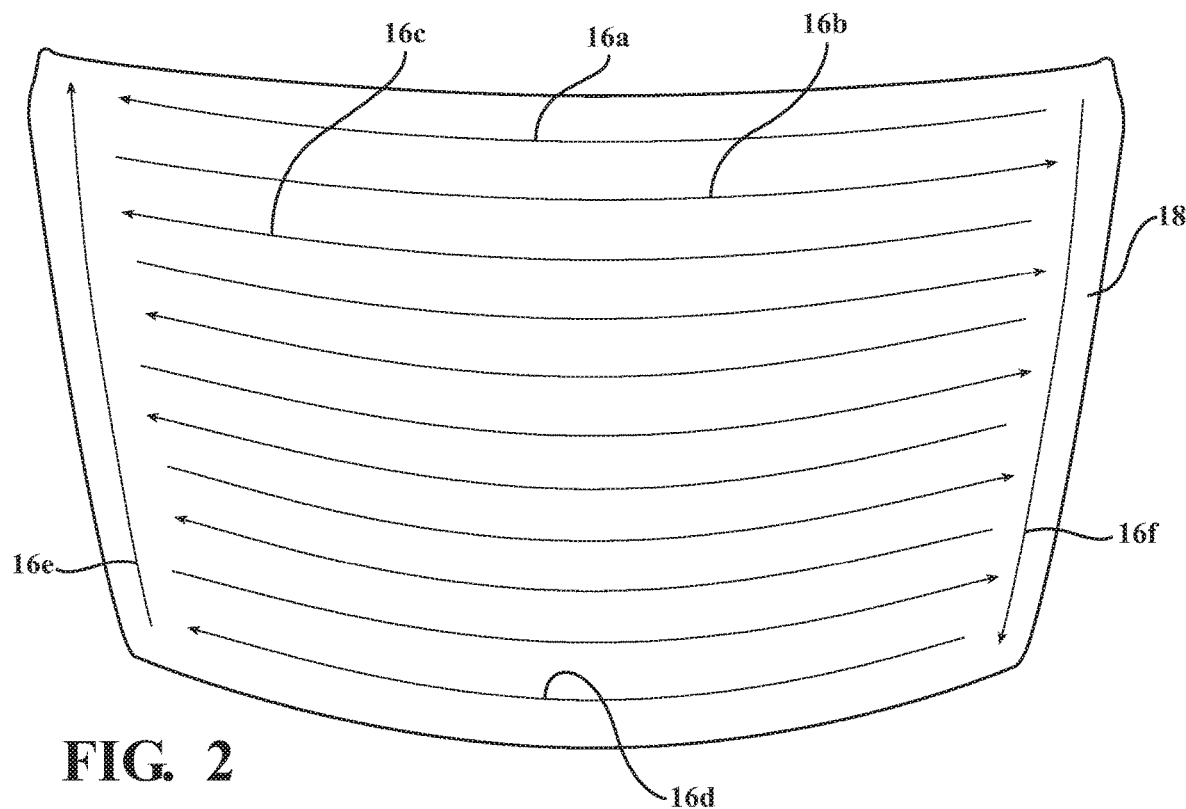
FIG. 2 is a schematic view of a representative pattern of runs of the robotically moved applicator die in fully covering an automobile hood.
Figure 3:
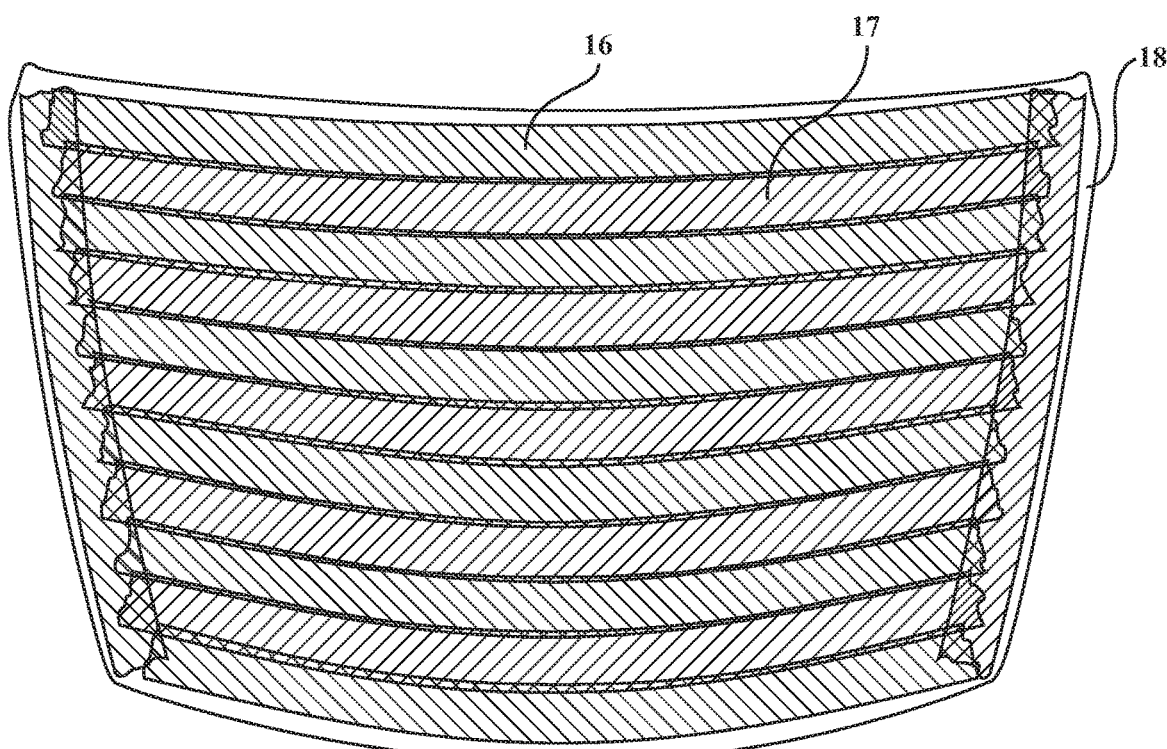
FIG. 3 is a plan view of the ribbons laid down by the run pattern of FIG. 2.

Referring now to FIGS. 2 and 3, the complete coverage of the hood 18 is achieved using crosswise movements to produce ribbons 16a, 16b, 16c and 16d in a back-and-forth fashion, the robot serving to index the applicator forward by just less than the width of the applied ribbon but without the need to rotate the applicator die 10 through 180° as the applicator die 10 is entirely ambidextrous; i.e., it has no "forward" side and operates in a spatial orientation nearly or completely orthogonal to the surface upon which material is being applied.

As shown in FIGS. 2 and 3, the material is applied to the surface of the hood in back-and-forth, overlapping ribbons until the forward-most ribbon 16*d* is applied at which time the applicator is rotated 90° and moved along the ribbon 16*e* to cover the left edge of the hood and the lateral ribbon ends, as shown in FIG. 2. The applicator is then moved to the top right portion of the hood, as shown in FIG. 3 to apply the final ribbon 16*f*. It will be noted that material is not applied across vehicle body seams. The pattern of ribbons in FIGS. 2 and 3 is illustrative only.

Figure 5:
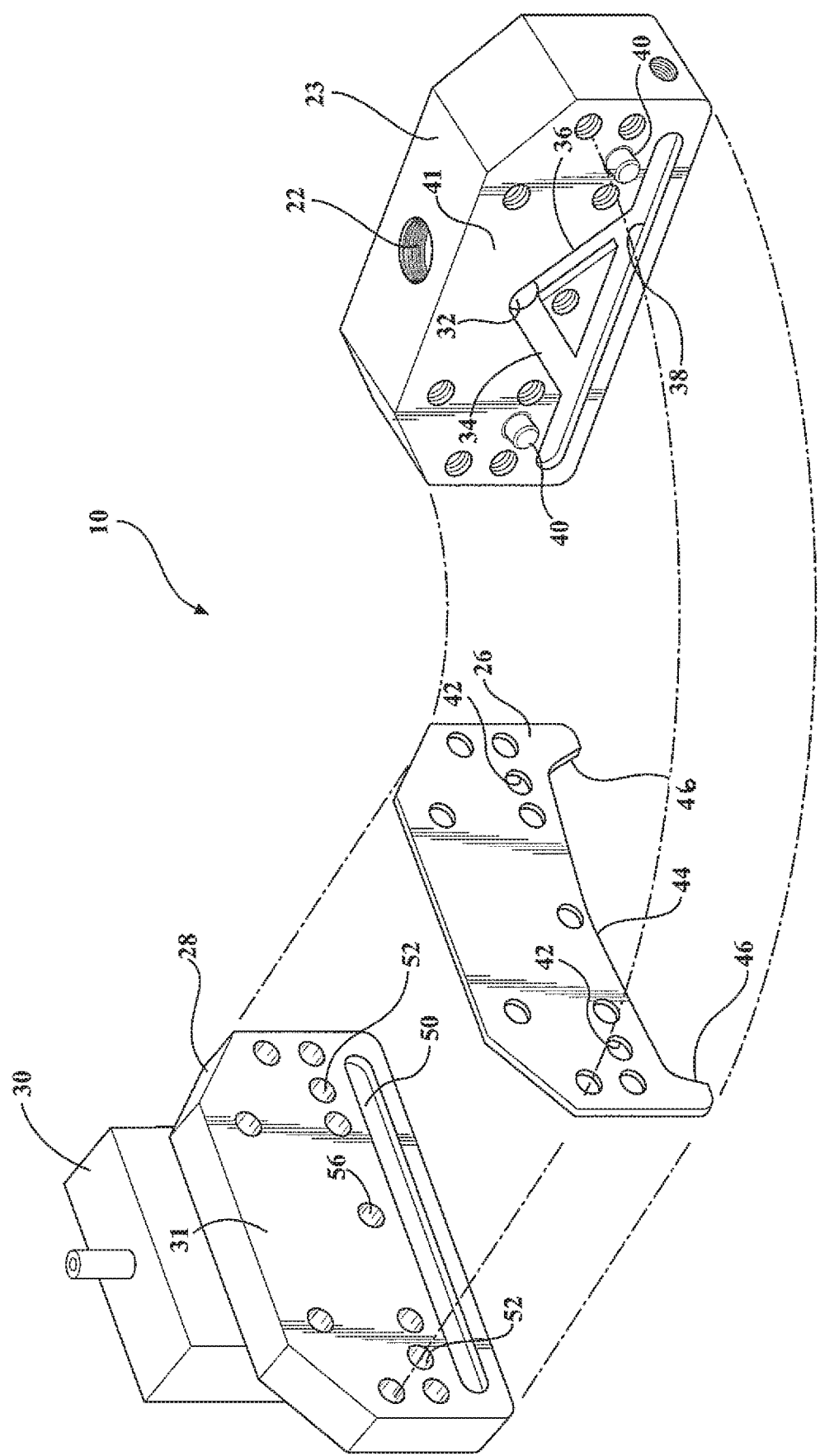
FIG. 5 is an exploded view of an applicator as described in the following specification.
Figure 6:
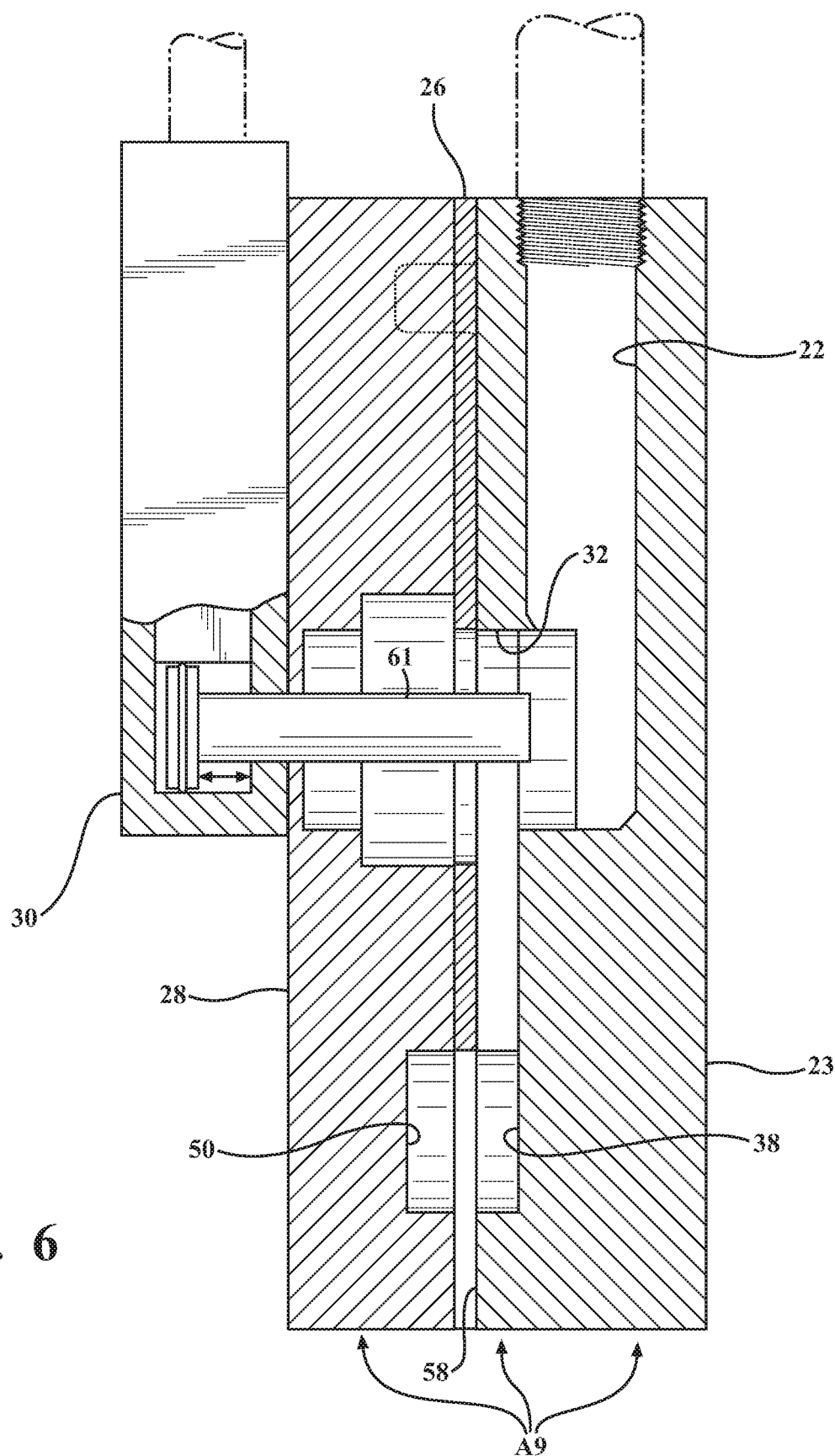
FIG. 6 is a sectional view through the application of FIG. 4.

Looking now to FIGS. 5 and 6, an applicator die 10 is shown. It is referred to as an "applicator die" because the film ribbons issued from it are essentially hydraulically extruded as opposed to atomized or aerated and sprayed. There is no "spray" of particles or droplets. The term "hydraulic extrusion" is used herein to mean a laminarized flow of non-atomized fluid propelled by hydraulic pressure rather than by air or other compressible propellant. The applicator die 10 is shown to comprise blocks 23 and 28 which are machined out of solid stainless steel, for example, about 3½" long by 2" high with rounded bottom corners and mitered top corners for weight reduction. Placed between the two blocks 23 and 28 in the assembled condition is a shim or spacer 26 made of brass, stainless steel, plastic or other suitable material having locator holes 22 so that it may be precisely located on guide pins 40 which are inserted into precisely located holes in the interior surface 41 of the block 23. A fourth element of the applicator die combination is a valve 30 which helps to produce sharper cutoffs as hereinafter explained.

Block 23 is thicker than block 28 and includes a threaded material entry port 22 which extends downwardly to approximately the center of the block where it communicates with a forwardly directed passage 32 which, in turn, feeds material into a gallery of machined grooves comprising diverging legs 34, 36 and a horizontal cross-groove 38, all of which are of the same depth. A horizontal groove 50 is formed in the inside surface 31 of block 28 in full face-to-face registry with groove 38 in block 23 to create a gallery volume parallel to and adjacent the bottom edge surface of the die. The spacer 26 fits flush against the inside surface 41 of the block 23 to cover most of the grooves 34 and 36 of the gallery; the shim has a lower cutout or "relief" 44 with 15° flared side edges 46, which terminate at points 47 on the radiused corner arc of the die block which is 36-degrees from the vertical centerline. The shim provides a gap between the inside surfaces 41, 31 of blocks 28 and 23, respectively, of uniform thickness for material to flow downwardly from the horizontal grooves 38 and 50 and out through the bottom outlet 58 of the die, as shown in FIG. 11. A preferred shim design is shown in detail in FIG. 11B. The ribbon of film preferably meets the target surface at a distance of between 5 and 15 mm from the bottom edge of the die 10, i.e., where the opposite sides of the ribbon have become essentially parallel.

Block 28 has locator holes 52 which receive the guide pins 40 and locate the block relative to the face 42 of the opposing block 23, as well as the hidden face of the spacer 26. Block 28 has a single horizontal gallery groove 50 which is opposite but co-extensive with the groove 38 within the relief 44 of the spacer 26 to allow the horizontal fluid chamber created by the two grooves 38, 50 to fill with the PVA material while preventing lateral outflow as well as upflow between the spacer and the inside surface 41 of the block 23. An aperture 56 cooperates with the valve 30 to pull the pin 61 out of the flow chamber when cutoff is desired. This rapidly increases chamber volume and correspondingly reduces chamber pressure, resulting in a slight negative pressure with material pull-back. This feature is optional.

When applied to a fully finished painted surface for temporary protective purposes, the material applied is polyvinyl acetate in an emulsion containing, for example, about 50% water and 50% polymer. When dispensed, the material is extruded from the applicator die 10 with a width of about 85 mm. Thereafter, it has been found that the material begins to converge due to surface tension. Accordingly, the spacing between the outlet 58 of the applicator die 10 and the surface upon which the ribbons are being applied is preferably held such that the material is applied at or near the point of maximum width where the opposite edges are parallel. See FIG. 7.

As indicated above, the applicator die 10 can be moved at the selected rate over the target surfaces while material is dispersed or extruded therefrom. When placed in an infrared oven, drying time of about 15 minutes has been shown to be possible at a temperature of 180°. Convective and/or microwave drying can also be used.

Figure 7A:
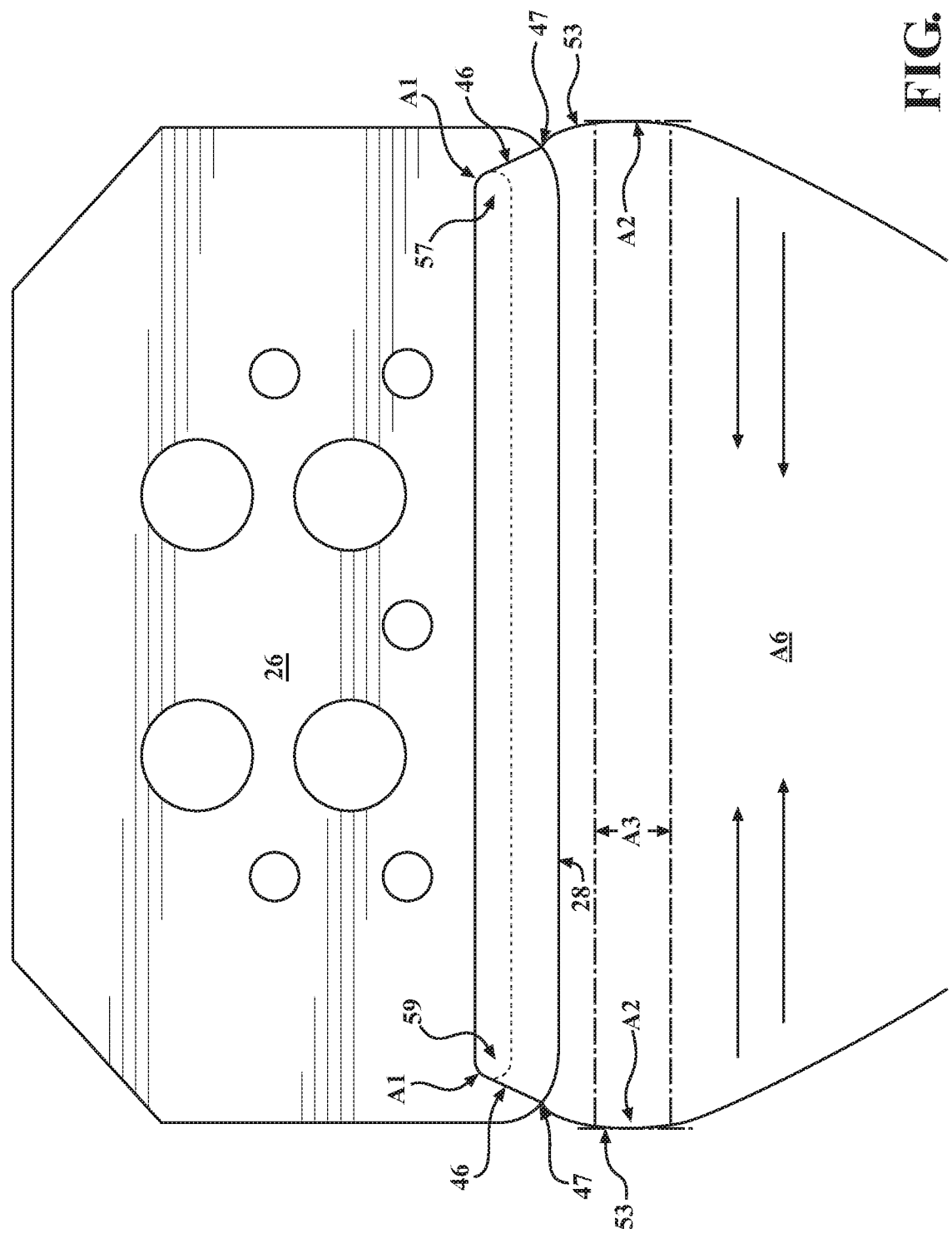
FIGS. 7A, B, C, and D are diagrams of a material ribbon emerging from applicator dies of different design.

It will be noted that the applicator die 10 is operated in a position which is orthogonal to the target surface rather than angled or tipped in the direction of flow as is the case with typical spray-type, deflective applicators. It will also be noted that the extruded ribbon of material being applied is not particled or atomized; rather, it is a full, continuous film of material moving outwardly and downwardly in laminar form and at a desired rate. Because the applicator is ambidextrous, it does not have to be turned around by rotation between parallel passes in opposite directions and this too, increases the rate at which an automobile body part, for example, a hood, can be covered. After coating, the component goes to an oven for faster curing. FIG. 7A shows how the film behaves as it leaves the applicator die 10. Because of the diverging or flared shape of the die exit slot, the ribbon diverges at 53 but quickly converges due to surface tension. The die-to-target spacing is preferably such as to apply the ribbon to the target surface at about the point of maximum ribbon width.

FIG. 7B shows how the extruded material behaves when using a spacer that defines the die outlet slot 59 with straight sided, parallel edges A5. The material converges immediately upon departing the die slot due to surface tension; see ribbon edges 53 and becomes difficult to control.

FIG. 7C shows in profile two ribbons that can be created using the dies of FIGS. 7A and 7B. The top ribbon A-8 is 300 microns thick and has 500 micron thick edge beads, measured at a distance of 10 mm from the die outlet. This is undesirable.

The bottom ribbon A-7 shows the ribbon profile produced by the invention die of FIGS. 5 and 11B. It is 200 microns thick with 250 micron edge beads at 10 mm from the slot outlet. This is a desirable profile. The very shallow edge beads promote clean peeling without excess material in the overlap areas or along the edges of the anti-chip coat.

Figure 8:
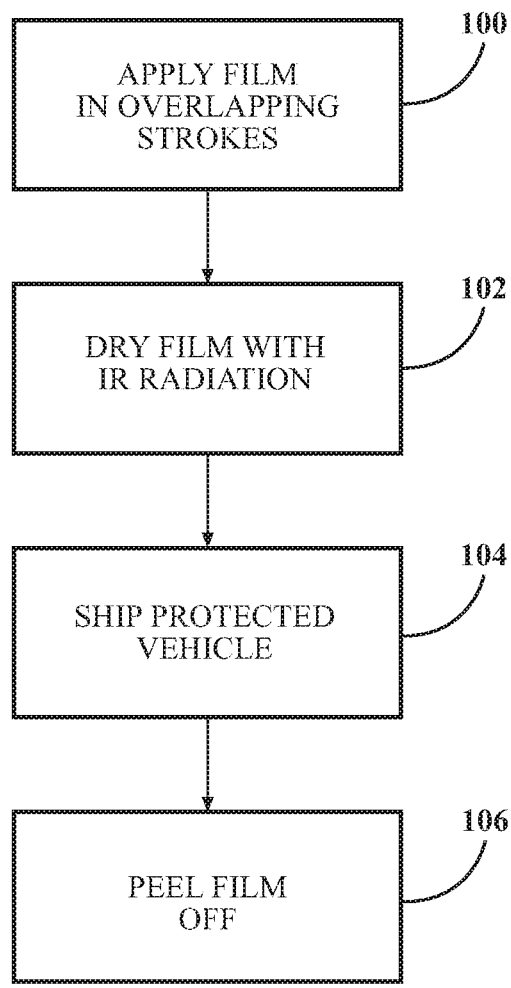
FIG. 8 is a block diagram of one of the methods described herein.

FIG. 8 is a schematic diagram of a method of applying a protective film of an automobile. The first step 100 as indicated by the legend is to apply the emulsion in overlapping and alternating strokes. The second step 102 is to dry the emulsion with infrared radiation. The third step 104, in the case of a manufactured automobile, is to ship the protected vehicle and the final step 106, typically performed by the dealer, is to peel the coating off of the vehicle and dispose of it in an environmentally appropriate fashion. It peels in one piece and the material can be recycled.

Figure 4:
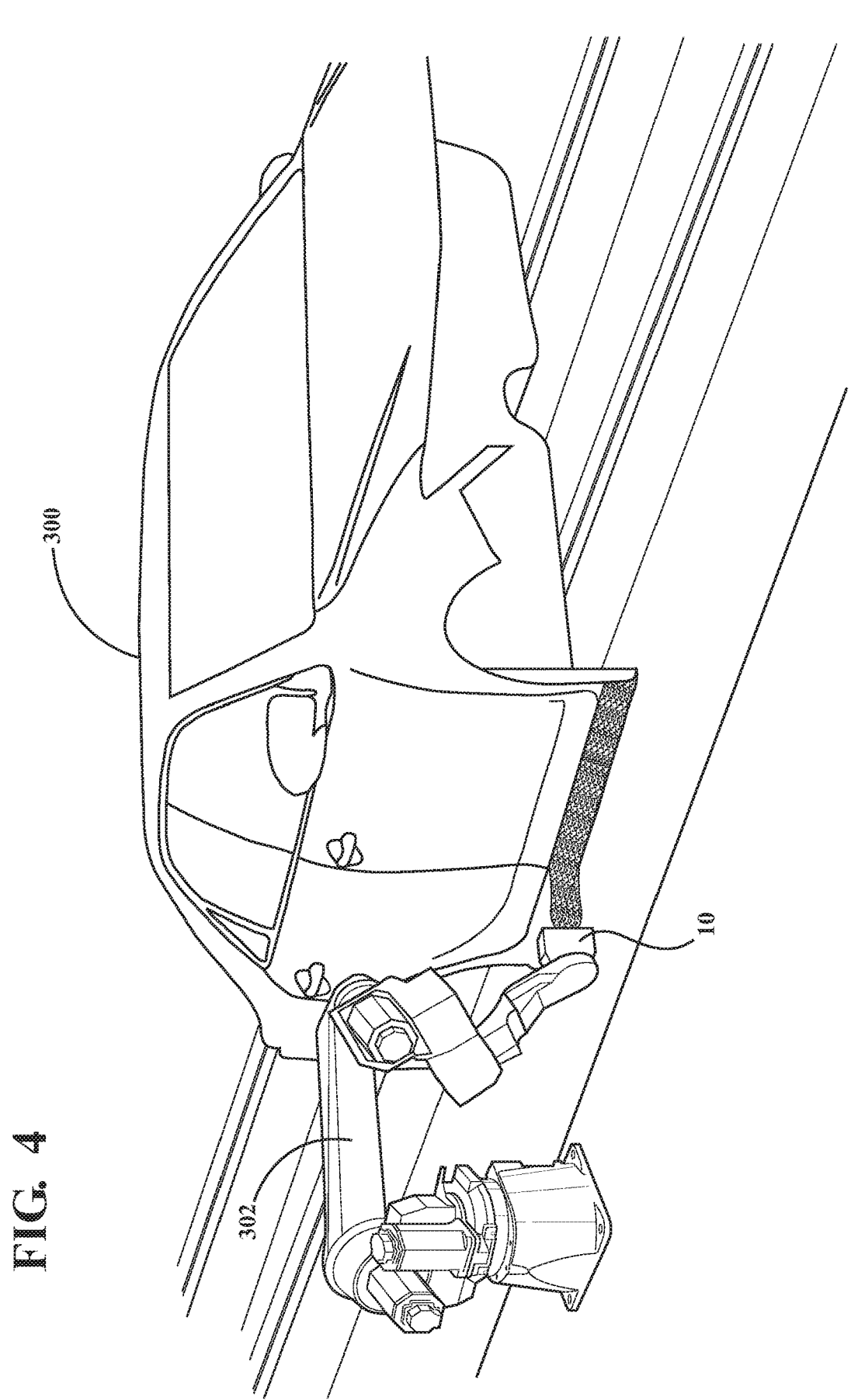
FIG. 4 is a perspective view of another application of the teachings herein as applied to the use of permanent protective films on rocker panels.
Figure 9:
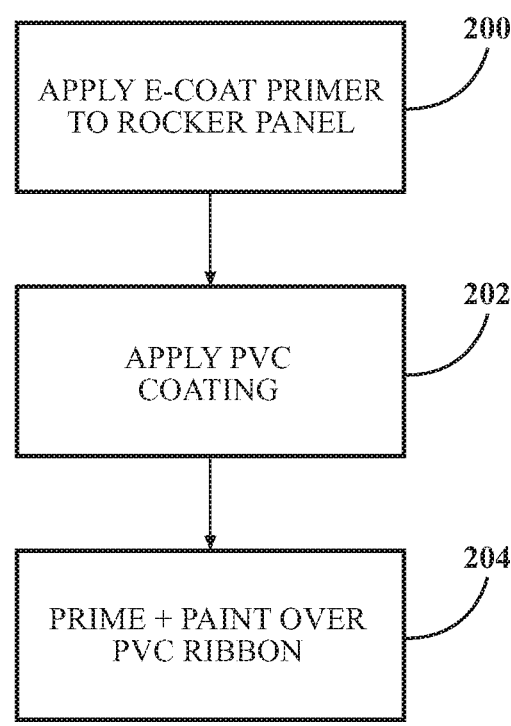
FIG. 9 is a block diagram of another method.
Figure 10:
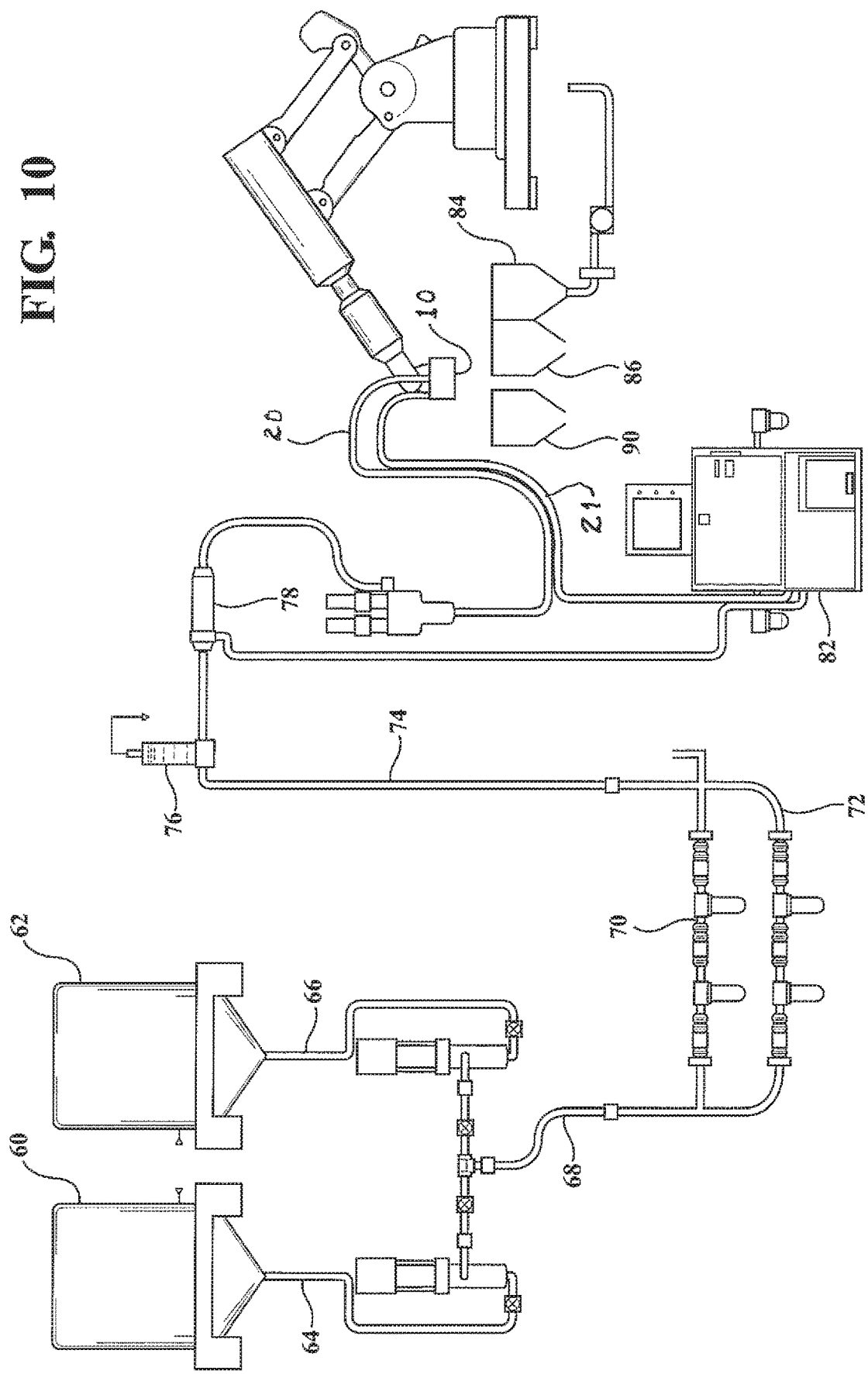
FIG. 10 is a schematic diagram of a complete system.

An alternative or additional method of using the applicator die 10 is shown in FIGS. 4 and 9. This method comprises a first step 200 of applying primer to a rocker panel of an automotive body 300 in conventional fashion. Thereafter, a robot 302 carrying an applicator die 10 essentially as shown in FIGS. 5 and 6 and described above is used in step 202 to apply a PVC emulsion to the primed rocker panel as an anti-chip coating. It will be understood that the applicator die 10 has material and coolant supply lines running to it as is the case for the film applicator in FIG. 1. In this case, the polyvinyl chloride solution or emulsion comprises a polymer in an organic solvent applied in a ribbon of the appropriate thickness while the rocker panel is essentially vertical. Temperatures, spacing and application rates are empirically determined in view of the fact that the material has a viscosity of about 50,000 centipoise. It has been found that additional primer and body color paint can be applied over the PVC ribbon in step 204 before it is dried; i.e., paint can be applied "wet-on-wet." The PVC surface produced by the applicator is glossy and uniform in thickness. In this embodiment, only one pass along the rocker panel is required.

There are numerous advantages to the use of this process for the anti-chip coating relative to the prior art process of spraying the coating on the car. Spraying requires the entire vehicle to be masked to protect it against overspray which is highly detrimental to paint finishes. Therefore, this method eliminates the need to mask the vehicle and to remove and dispose of the masking materials. In addition, the laminarized ribbon offers a smooth, glossy appearance as compared to the rough appearance caused by spraying.

Figure 11A:
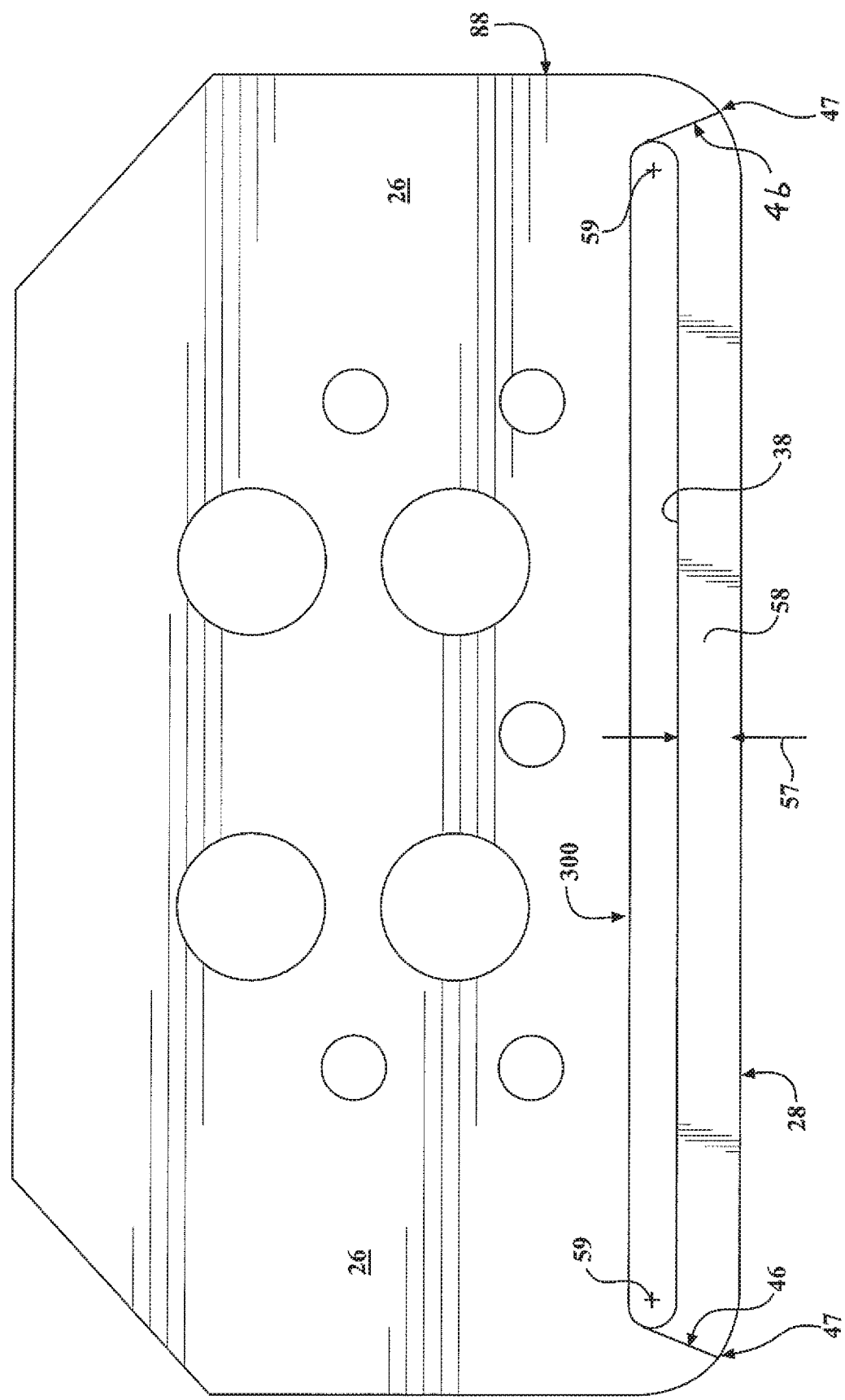
FIGS. 11A and B are full and partial plan views of the shim 26 of FIG. 5 overlying a die block 20 wherein FIG. 11B indicates a flow pattern found to be advantageous.
Figure 11B:
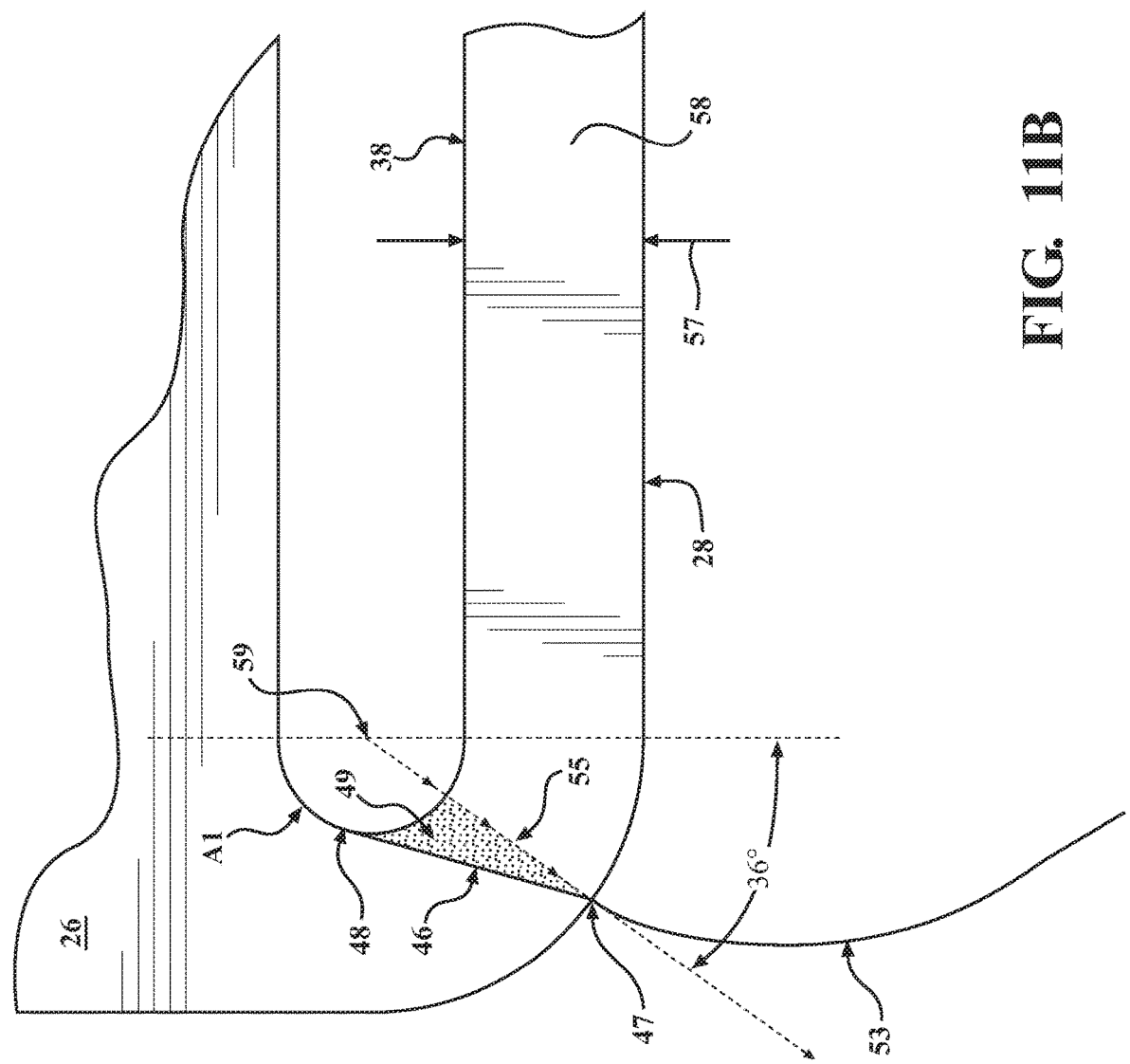

FIGS. 11A and B show the preferred embodiment of the extrusion die and especially the geometry of the relief 44 in the shim 26 relative to the groove 38 and the 180° rounded ends A-1 thereof. FIG. 11A shows the shim 26 overlying the die block 28 with the top edge 300 of the shim relief overlying and coextensive with the top edge of the gallery groove 38. The right and left corner or inside edges 46 of the shim partially follow the curve of the gallery groove end, but flare downward to a point 47 which is located at the 36-degree point along the arc of the outer die block 28 corner radius. Both the right and left inside edge lines 46 of the shim, which begin at the outer radius point 47, terminate at point 48 where they intersect the tangent of the half-circle (A-1) of the right and left ends of gallery groove 38. The right and left end-points of the shim at 47 define the endpoints of the extrusion slot which will therefore determine the width of the ribbon as it emits from the slot. In FIG. 11B, the gallery groove radius (A-1) and the outer die block corner radius at point 47 share the same co-radial center point 59. Therefore, the internal extrusion slot surface distance 57 over which the material exiting the die flows in contact with the slot surfaces 58 is a constant width 57 from inlet edge to outlet edge, including the curved portions at the right and left ends of the slot which arc upward to the 36-degree endpoint of the slot, as terminated by the 46 edge of the shim. This allows a uniform velocity of material emitting from the slot outlet face A-9 on the die block from ribbon edge to edge, all across the width of the slot. The ribbon trajectories will emit at an angle normal (perpendicular) to the slot face A-9 of the die block, which means that ribbon trajectories emitting at any point along the straight segment of the slot will all be parallel, but in the curved ends of the slot at the right and left corners of the die block, the trajectories will gradually diverge from zero degrees to 36-degrees at the right and left slot end-points at 47. This enables the outer right and left edges of the material ribbon 53 to exit the die slot at a trajectory of 36-degrees from the centerline of the ribbon. Immediately as the ribbon emerges and flows out from the slot however in FIG. 7, the inherent surface tension A6 of the ribbon material will pull across the ribbon width to gradually arc the right and left edge trajectories inward toward each other an angle at first parallel (or zero degrees) to the centerline of the ribbon, and then will continue to arc inward to a final trajectory having a negative angle to the centerline of the ribbon (about −20 degrees). If allowed to continue, both ribbon edges would finally intersect and the ribbon would undesirably coalesce into a rod or cylinder of free-flowing material, instead of a ribbon.

The zone of the emerging ribbon where the right and left ribbon edges are substantially parallel to the ribbon centerline at A-2, is designated the "zone of controlled film width and thickness" A-3, which is where the process of this disclosure is carried out. This sector of the ribbon extrusion, which is generally 5 to 15 mm from the face of the die block, has a substantially uniform edge-to-edge width (about 85 mm wide in this embodiment) and a constant film thickness of about 0.2 mm or 200 microns edge to edge. This ribbon zone of 5 to 15 mm from the slot face of the applicator, therefore defines the ideal range of distance (same 5-15 mm) for the applicator to dispense an optimum ribbon shape onto a surface. For this reason, robotic motion for dispensing ribbons is programmed such that the slot face of the applicator is taught a nominal 10 mm distance from the substrate surface. This will produce a wet ribbon extrusion on the substrate surface which will be of uniform width (85 mm, plus or minus 1 mm) and of uniform wet film thickness (0.2 mm). The only variance in wet film thickness across the width of the ribbon, are found at the edges, for no more than 1 mm inside the ribbon edge, where the wet material thickness is measured to be about 0.25 mm. (A-7 in FIG. 7C). This increased thickness (0.05 mm) which occurs within a millimeter from the right and left edges of the ribbon, is an advantage which enhances the peelability of the dry film when it is removed from the car body. Conversely, ribbon edges which are tapered under the 0.2 mm wet film thickness are a detriment in this application, since the tensile strength of the thinner film will be weaker than the adhesive strength holding the dry film to the substrate, and the dry film will tear at the edges during removal, leaving troublesome lines of dried film residue along the perimeter boundary of the ribbon pattern on the car body.

FIG. 7B shows the ribbon edge profile A4 produced by conventional extrusion means which are considered prior art, where the shim is trimmed at A5 (instead of at 46) which is at the right and left termini of the straight segment of the slot. This is a straightforward design which insures that all points of the ribbon emerging from the straight slot face are at the same velocity and in a parallel trajectory normal to (or perpendicular to) the slot face. Often, and especially with higher viscosity materials like clays and ductile metals, this will produce a ribbon of material having the same extruded width as the slot opening width of the die block. In the case of polymer emulsions however, which are relatively low viscosity liquids, the force of surface tension A6 in the liquid ribbon shape as it emerges from the die slot will immediately draw the ribbon edges together A4 as described above. This ribbon produced from the conventional design will have no parallel edges A2 for creating a "zone of controlled width and thickness" and can only emit a ribbon of constant width ribbon length and thickness at a distance no more than 1 mm from the die face A-9. The consequence of robotically applying transit coating from a die block only 1 mm from the car body surface is impractical and dangerous and therefore unfeasible. Applying a transit coating emulsion with this conventional die block design at the standard 10 mm distance (as used in the invention) would produce a narrower ribbon where the overall thickness of the ribbon will be greater than the specified 0.25 mm limit, and the ribbon edges will have grown considerably to 0.5 mm thick for a width of 3 mm or more (see A-8, FIG. 7B), will propagate drips and runs, and require considerably longer drying times for the thicker edge portions, which would also be unfeasible in production.

FIG. 11B shows the exit trajectory of the ribbon edge at 47 aligned with the internal flow trajectory of the material 55 passing across the slot distance 57. The angle of flow trajectory 55 is defined by two points on this line: the radius centerpoint 59, and the shim termination point at 47. This line of trajectory (shown in this embodiment as 36-degrees from centerline) is also the shortest flow path for the material travelling across the slot distance 57, which will pass by the shim terminus at point 47 to form the edge of the ribbon when it exits the slot. The difference between the 36-degree flow trajectory angle at the end of the slot, and the angle of the shim edge 46 creates a triangular area 49 within the slot 57 where comparatively little material flow takes place. The triangular area 49 does however create an area of "laminar relief" adjacent to the flow path of the material which will form the edge of the ribbon. This feature of the triangular area 49 containing material adjacent to the main flow path for the ribbon edge contributes less resistance to the flow path than if the shim edge 46 were aligned directly along that path way at a 36-degree angle. When the shim edges at 46 are aligned with the 36" degree material path, they present a hard boundary adjacent to material flow across the slot distance 57, which slows the ribbon velocity at the edges when emerging from the slot face, causing increased thickness of the ribbon edge (>0.3 mm or 300 microns) when dispensed on the substrate surface, which is undesirable. The laminar relief created by area 49 creates less boundary impedance and consequently higher velocity for the adjacent faster-flowing material which will form the ribbon edge when it exits the slot, and thereby produces the ideal ribbon edge thickness (0.25 mm) on the substrate.

The ribbon edge exit angle which is controlled by the shim edge 46 and endpoint 47 were optimized at 36-degrees in the present embodiment to create the optimum "zone of controlled film width and thickness" for transit coating material application, and this was determined from observation and experimentation. However, other polymer emulsion formulas for other types of application, which may have a lower or higher viscosity, and/or a greater or lesser ribbon thickness requirement, may require a greater or lesser ribbon edge exit angle to optimize the zone of controlled width and thickness for that material and application. For this reason the active range of this invention for the possible exit angles of the ribbon edge which will produce the optimized zone of controlled width and thickness will lie between 5 degrees and 50 degrees relative to the applicator centerline. Likewise, although the width of the ribbon of the present embodiment is 85 mm, the straight segment of the applicator gallery and slot can be elongated considerably while preserving the radiused slot endpoint geometry to produce ribbon widths of 200 mm or even wider, or narrower ribbon widths could be produced by shortening the straight slot segment down to a ribbon width of about 25 mm. The scalability of ribbon width (25 mm or greater), and the range of viable ribbon edge exit angles (5 to 50 degrees) are inherent to the invention.

FIG. 10 is a schematic diagram of a representative system, in this case, for the application of the PVA film as a protective coating. However, the essentials of the system are the same for all applications. As shown in the drawing, material is supplied from drums 60, 62 through lines 64 and 66 which are connected into a Y conduit 68 and from there through parallel legs 70, 72 with drains. Conduit 74 flows from the leg 72 through a filter 76 and from there into a heat exchanger 78 which is controlled by a temperature controller 82. Finally, the material flows into the conduits 80 which supply the applicator die 10. Adjacent the applicator die 10 in a standby position is a liquid-filled cleaning standby station 84 with an interior brush which can be activated as necessary. The fluid in the case of the aqueous PVA emulsion is water. Next to the cleaning standby station 84 is a cleaning station 86 where the applicator can be blow-dried. A purge station 90 may be used where desired.

Summarizing, the applicator die 10 uniquely dispenses a ribbon of material of uniform thickness at a controlled speed and with improved edge control. PVA in a water emulsion is used in the protective film application process of FIG. 8 or for masking. PVC in an organic emulsion is used for the anti-chip coating. The two examples demonstrate that the film ribbons can be applied to horizontal as well as vertical surfaces. They can also be applied to inverted and curved surfaces. Although a shim between the two body parts is shown, the objective is to shape the die outlet slot so that the side and bottom edges are such that (a) the film ribbon flares outwardly at about 36° and (b) the distance the film travels from the center of the gallery grooves to the bottom edge of the slot is constant across the slot width; i.e., from left radiused edge to the right radiused edge, thereby promoting a constant exiting film velocity across the ribbon.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system of applying a thin peelable, temporary protective film to the finished surface of a manufactured article comprising:

- a source of a polymeric emulsion having a viscosity of about 3,000 to 12,000 centipoise at a predetermined operating temperature;
- an extrusion die having a body with an inlet connected to receive said emulsion from said source and having an outlet slot with a length substantially greater than its width to produce thin non-atomized ribbons of said emulsion at a thickness of about 200 microns; and
- a robot to which said die body is attached for applying one or more ribbons of said emulsion to said finished surface by controlled movement that maintains said die outlet at a constant distance from said surface during the extrusion of said emulsion, which distance is substantially greater than the width of the slot and resulting thickness of said ribbons.

2. The system as defined in claim 1 wherein the distance between the outlet slot and the surface is between about 5 mm to 15 mm.

3. The system as defined in claim 1 further including means for controlling the temperature of said die body at said predetermined operating temperature thereby to control the viscosity of said emulsion.

4. The system as defined in claim 1 wherein the polymer is polyvinyl acetate.

5. The system as defined in claim 1 wherein the article is a painted component of an assembled automobile.

6. The system as defined in claim 1 wherein the rate at which said emulsion is extruded from said die outlet is substantially equal to the speed of movement of said die body relative to said surface.

* * * * *